(12) United States Patent
Tsirkin et al.

(10) Patent No.: US 9,436,505 B2
(45) Date of Patent: Sep. 6, 2016

(54) POWER MANAGEMENT FOR HOST WITH DEVICES ASSIGNED TO VIRTUAL MACHINES

(71) Applicant: Red Hat Israel,Ltd., Ra'anana (IL)

(72) Inventors: Michael Tsirkin, Ra'anana (IL); Alex Williamson, Fort Collins, CO (US)

(73) Assignee: Red Hat Israel, Ltd., Ra'anana (IL)

( * ) Notice: Subject to any disclaimer, the term of this patent is extended or adjusted under 35 U.S.C. 154(b) by 519 days.

(21) Appl. No.: 13/773,755

(22) Filed: Feb. 22, 2013

(65) Prior Publication Data

US 2014/0245050 A1    Aug. 28, 2014

(51) Int. Cl.
    *G06F 1/00*    (2006.01)
    *G06F 9/48*    (2006.01)
    *G06F 1/32*    (2006.01)
    *G06F 9/455*    (2006.01)
    *G06F 9/46*    (2006.01)

(52) U.S. Cl.
    CPC ........... *G06F 9/4881* (2013.01); *G06F 1/3287* (2013.01); *G06F 9/45558* (2013.01); *G06F 9/461* (2013.01); *G06F 9/4893* (2013.01); *Y02B 60/1282* (2013.01); *Y02B 60/144* (2013.01); *Y02B 60/32* (2013.01)

(58) Field of Classification Search
    CPC .. G06F 1/3234; G06F 9/4881; Y02B 60/144
    See application file for complete search history.

(56) References Cited

U.S. PATENT DOCUMENTS

| 5,778,443 A | * | 7/1998 | Swanberg et al. | ............. 711/162 |
| 2007/0112999 A1 | * | 5/2007 | Oney | ....................... G06F 21/53 711/6 |
| 2010/0095144 A1 | * | 4/2010 | Yamanaka | ............... A63F 13/10 713/323 |
| 2014/0089920 A1 | * | 3/2014 | Yamamoto | ............ G06F 1/3287 718/1 |

* cited by examiner

*Primary Examiner* — Jaweed A Abbaszadeh
*Assistant Examiner* — Austin Hicks
(74) *Attorney, Agent, or Firm* — Haynes and Boone, LLP

(57) ABSTRACT

A system and method of removing power from a device assigned to a virtual machine running on a host machine includes receiving a request, by a notification module, from the virtual machine to remove power from the device, and receiving, by the notification module, an indication from the virtual machine that a condition has been satisfied; managing an execution priority for requests, by a task module, where the task module schedules the request to be executed after the notification module receives the indication that the condition has been satisfied; and in response to execution of the request, by a power down module, sending a communication to the host machine to cause the host machine to remove power from the device.

20 Claims, 7 Drawing Sheets

Hypervisor 130

Virtual Machine 102

POWER MANAGEMENT FOR HOST WITH DEVICES ASSIGNED TO VIRTUAL MACHINES

BACKGROUND

The present disclosure generally relates to a computing system, and more particularly to power management of a device in a virtual environment.

A virtual machine is a portion of software that, when executed on appropriate hardware, creates an environment allowing the virtualization of an actual physical computer system. Each virtual machine may function as a self-contained platform, running its own operating system (OS) and software applications (processes).

A host machine (e.g., computer or server) is typically enabled to simultaneously run one or more virtual machines, where each virtual machine may be used by a local or remote client. The host machine allocates a certain amount of the host's resources to each of the virtual machines. Each virtual machine may use the allocated resources to execute applications, including operating systems known as guest operating systems. The hypervisor virtualizes the underlying hardware of the host machine or emulates hardware devices, making the use of the virtual machine transparent to the guest operating system or the remote client that uses the virtual machine.

Typically, a hypervisor manages allocation and virtualization of computer resources and performs context switching, as may be necessary, to cycle between various virtual machines. A hypervisor may assign a physical device to a virtual machine such that the virtual machine has direct access to the physical device. This may provide several advantages. For example, a virtual machine having direct access to a physical device may access the physical device faster, resulting in lower latency and improved performance. In theory, this may provide near-native performance.

BRIEF SUMMARY

This disclosure relates to power management for a host machine with devices assigned to a virtual machine running on the host machine. Methods, systems, and techniques for removing power from the device assigned to the virtual machine running on the host machine are provided.

According to an embodiment, a system for removing power from a device assigned to a virtual machine running on a host machine includes a notification module that communicates with the virtual machine, receives a request from the virtual machine to remove power from the device, and receives an indication from the virtual machine that a condition has been satisfied. The example system also includes a task module that manages an execution priority for requests, where the task module schedules the request to be executed after the notification module receives the indication that the condition has been satisfied. The example system further includes a power down module that, in response to execution of the request, sends a communication to the host machine to cause the host machine to remove power from the device.

According to another embodiment, a method of removing power from a device assigned to a virtual machine running on a host machine includes receiving a request from the virtual machine to remove power from the device. The method also includes scheduling the request, to remove power from the device, to be executed after receiving an indication that a condition has been satisfied. The method further includes receiving the indication from the virtual machine that the condition has been satisfied. The method also includes after the request has been satisfied, sending a communication to the host machine to cause the host machine to remove power from the device.

According to another embodiment, a non-transitory machine-readable medium includes a plurality of machine-readable instructions that when executed by one or more processors are adapted to cause the one or more processors to perform a method including receiving an indication that a host machine will be suspended; scheduling one or more instructions, to suspend the host machine, to be executed after removal of power from the device; responsive to receiving the indication that the host machine will be suspended, sending a first communication to the virtual machine to cause the virtual machine to stop using the device, to further cause the virtual machine to save first state information maintained by the virtual machine to memory, and to further cause the virtual machine to suspend, where the first state information is associated with the device; receiving an indication that the virtual machine has been suspended; responsive to receiving the indication that the virtual machine has been suspended, saving second state information maintained by the host machine to memory, where the second state information is associated with the device; after saving the second state information, sending a second communication to the host machine to cause the host machine to remove power from the device; determining that power has been removed from the device; and responsive to the removal of power from the device, sending a third communication to the host machine to cause the host machine to suspend.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
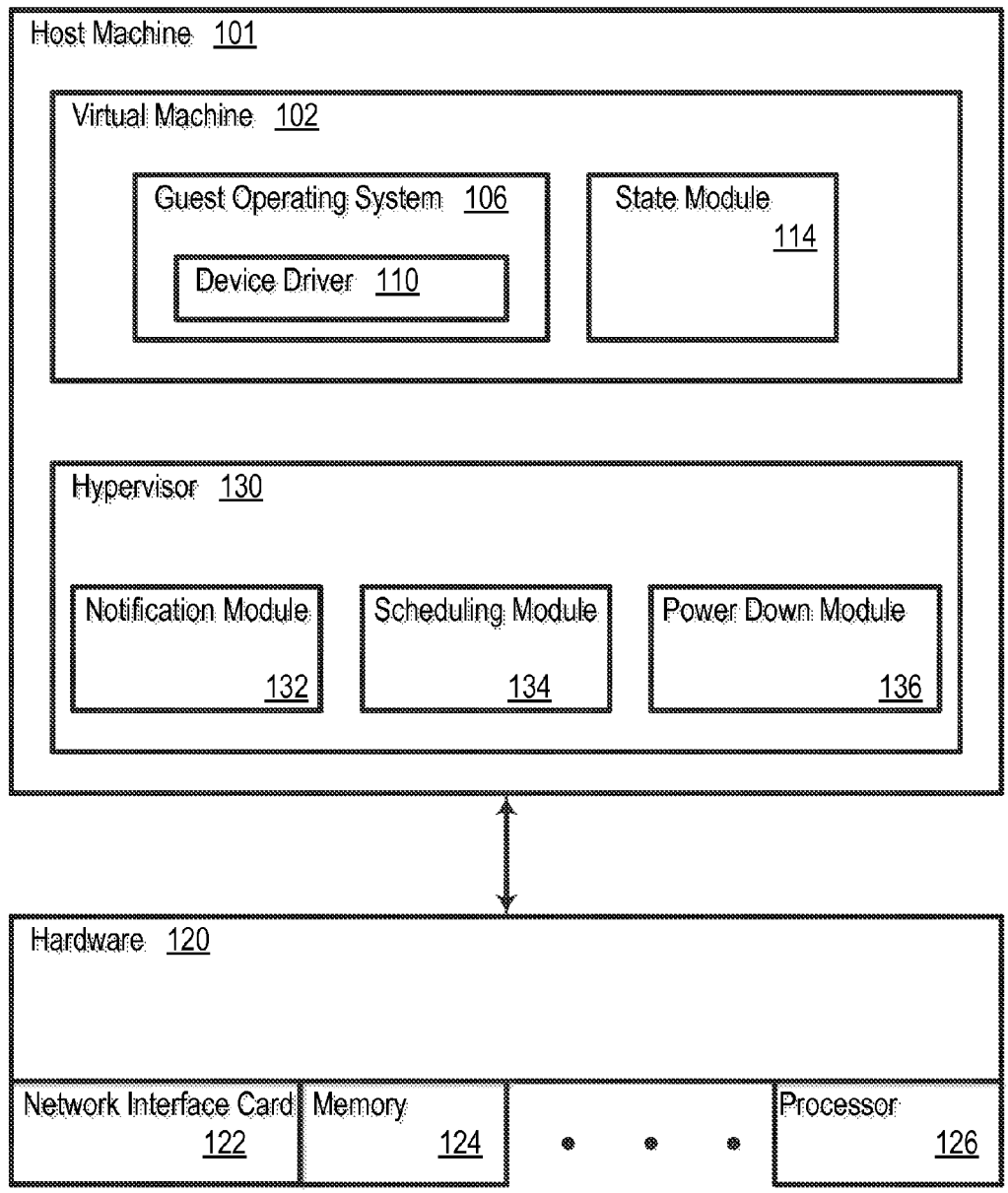
FIG. 1 is a simplified block diagram illustrating a system for removing power from a device assigned to a virtual machine, according to an embodiment.

I. Overview
II. Example Host Machine
A. Request to Remove Power from Device
B. Power to Device is Restored
III. Host Suspend Example
IV. Example Methods
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Devices may be assigned to a host machine and may enter various power states. For example, before suspending, the host machine may iterate through each device assigned to the host machine and remove power from the device (e.g., by switching the device to a low power state). In this way, the host machine may conserve power.

A device is associated with a state. In a virtual environment, some state information runs through the actual hardware device, and some state information does not run through the actual hardware device and is instead simulated in the hypervisor. Accordingly, the host machine may maintain device state information and the virtual machine (VM) may maintain its own device state information. The device state information maintained by the host machine may be different from the device state information maintained by the VM. The hypervisor may maintain state information associated with the device, and this device state informatin may be under the control of the host machine. Similarly, the VM may maintain its own state information associated with the device, and this device state informatin may be under the control of the VM. An example of device state information maintained by the host machine is a physical address space of the device, and an example of device state information maintained by the VM is a virtual address space of the device.

If power is removed from a device assigned to a virtual machine without saving the device state information maintained by the VM, this may result in an unknown device state when power is restored to the device and the VM resumes using the device. The hypervisor may be unable to save the device state information maintained by the VM because the device state information maintained by the VM is unavailable to the hypervisor. Further, the device may fail to recognize or respond to the indication that the host machine will be suspended. Accordingly, if the host machine suspends, the VM may fail to save the device state information before the host machine suspends. Another outcome may be that the device prevents the whole system from suspending.

Before power is removed from the device, it may be desirable to save both the device state information maintained by the host machine and the device state information maintained by the VM so that the device state information may be restored when power is restored to the device. In this way, when power is eventually restored to the device, the VM may restore the device state information and resume using the device based on the saved state information.

II. Example Host Machine

FIG. 1 is a simplified block diagram 100 illustrating a system for removing power from a device assigned to a VM, according to an embodiment.

Diagram 100 includes a host machine 101 coupled to hardware 120. Examples of hardware devices are network interface card (NIC) 122, memory 124, and processor 126.

A host machine may run one or more virtual machines that run applications and services. Host machine 101 includes a VM 102 and a hypervisor 130. Hypervisor 130 may provide VM 102 with access to hardware devices to perform input/output (I/O). VM 102 runs a guest operating system (OS) 106 that may be different from another guest OS system running in another VM that is running on host machine 101 (not shown) and may also be different from the host OS running on host machine 101 (not shown). The host or guest OS may include, for example, MICROSOFT® WINDOWS®, LINUX®, SOLARIS®, and MAC OS. Trademarks are the property of their respective owners. Guest OS 106 may execute a device driver 110 that communicates directly with hardware devices without mediation from hypervisor 130.

VM 102 also includes a state module 114 that manages the state of the devices assigned to VM 102. State module 114 saves state information maintained by VM 102 to memory (e.g., virtual memory or a virtual disk). For example, hypervisor 130 may assign NIC 122 to VM 102, which may use NIC 122 to receive and send data over a network. In this example, VM 102 may maintain state information associated with NIC 122, such as pending interrupts, received packets, and packets to be sent to another network interface, and save the state information associated with NIC 122 to memory.

A. Request to Remove Power from Device

Host machine 101 includes a notification module 132, a task module 134, and a power down module 136. In an embodiment, notification module 132 communicates with one or more virtual machines and receives a request from a virtual machine to remove power from a device assigned to the virtual machine.

In an example, to remove power from the assigned device, VM 102 may send a request to hypervisor 130 to remove power from the device. VM 102 may send the request to hypervisor 130 based on a variety of reasons. For example, if VM 102 has not used the device for a threshold period of time, VM 102 may send the request to remove power from the device. In another example, the device assigned to VM 102 may be an optional device that consumes a lot of power and VM 102 may decide to remove power from the device to conserve power. For instance, if the battery power of the host machine falls below a threshold, VM 102 may send the request to remove power from the device. In another example, the user may request that power be removed from the device. For instance, the user may enter input via a mouse or keyboard to instruct the system to remove power from the device.

VM 102 may send the request to remove power before VM 102 actually stops using the device or before VM 102 saves the device state information to memory. In an embodiment, notification module 132 waits to receive an indication that a condition has been satisfied before executing the request to remove power from the device. In an example, when the VM has stopped using the device and the state module has saved the device state information to memory, the condition has been satisfied. In another example, when the VM has been suspended, the condition has been satisfied.

Notification module 132 may receive an indication from the virtual machine that sent the request that the condition has been satisfied. In an example, notification module 132 is active and polls VM 102 to determine whether the condition has been satisfied. In another example, notification module 132 is passive and waits until VM 102 sends the indication to notification module 132 that the condition has been satisfied.

In an embodiment, task module 134 manages an execution priority for requests. Task module 134 may schedule the request to remove power from the device to be executed after notification module 132 receives the indication that the condition has been satisfied. Task module 134 may trap the request and delay execution of the request such that it is not executed until after notification module 132 receives the indication that the condition has been satisfied. In an example, task module 134 traps the request and delays execution of the request until after notification module 132 receives the indication that VM 102 has stopped using the device and has saved the device state information maintained by VM 102 to memory. In this example, the condition may be satisfied when VM 102 has stopped using the device and has saved the device state information maintained by VM 102 to memory. In another example, task module 134 traps the request and delays execution of the request until after notification module 132 receives the indication that VM 102 has been suspended. In this example, the condition may be satisfied when VM 102 has been suspended. VM 102 may stop using the device and save the device state information maintained by VM 102 to memory before VM 102 suspends.

Hypervisor 130 may execute requests from a queue. Task module 134 may assign a lower priority to the request such that the request is not executed until after notification module 132 receives the indication that the condition has been satisfied.

After notification module 132 receives the indication that the condition has been satisfied, the request from the virtual machine to remove power from the device may be executed. In an example, hypervisor 130 executes the request to remove power from the device.

In an embodiment, power down module 136, in response to execution of the request to remove power from the device, sends a communication to the host machine to cause the host machine to remove power from the device. The host machine, in response to the communication to remove power from the device, may remove power from the device. Accordingly, one or more instructions to remove power from the device may be executed by the host machine.

Hypervisor 130 may determine that power has been removed from the device. At this point, the device state information maintained by VM 102 is safe and stored in memory. Hypervisor 130 may ensure the state of the memory (e.g., virtual memory or a virtual disk) is consistent with the state that the memory was in when the device state information maintained by VM 102 was saved. The saved device state information maintained by VM 102 may be restored in the future such that VM 102 may resume using the device based on the saved device state.

After power is removed from the device, VM 102 may iterate through its other assigned devices and remove power from one or more of these devices. Alternatively, VM 102 may continue to use other devices that are assigned to it or may suspend.

B. Power to Device is Restored

Power may be restored to the device (e.g., by switching the device to a full or high power state) and the VM may then resume using the device. In the above example, before power was removed from the device, the VM saved the device state information maintained by the VM.

In an embodiment, notification module 132 communicates with the host machine and receives an indication that power has been restored to the device. Notification module 132, in response to the indication that power has been restored to the device, may notify VM 102 that the assigned device is available. The notification may cause state module 114 to restore the saved device state information maintained by VM 102 and associated with the device. VM 102 may then resume using the device based on the previously saved device state information after it has been restored.

As discussed above and further emphasized here, FIG. 1 is merely an example, which should not unduly limit the scope of the claims. For example, although block diagram 100 is described herein with reference to one VM, host machine 101 may run more than one VM without departing from the spirit and scope of the disclosure. Further, it should be understood that other hardware devices may also be used by host machine 101 or virtual machine 102. Moreover, host machine 101 may be coupled to fewer than three or more than three hardware devices.

Further, each of notification module 132, task module 134, and power down module 136 may include one or more modules. For example, notification module 132 may be split into a first notification module and a second notification module. Moreover, notification module 132, task module 134, and power down module 136 may be incorporated into the same module.

III. Host Suspend Example

When the host machine receives a request to suspend, the host operating system may iterate through each device assigned to the host machine. For each assigned device, the host machine may stop using the device, save the device state information maintained by the host machine, and remove power from the device. When a device is assigned to the virtual machine, however, the host machine may be unable to access the device state information maintained by the VM. Accordingly, the host machine may be unable to control the state of the device or its state information if the device is assigned to the virtual machine.

This disclosure provides a technique in which power may be removed from a device and the device state information maintained by the host machine and the device state information maintained by the VM may be saved and restored such that the virtual machine may resume using the device based on the previously saved device state information.

Figure 2A:
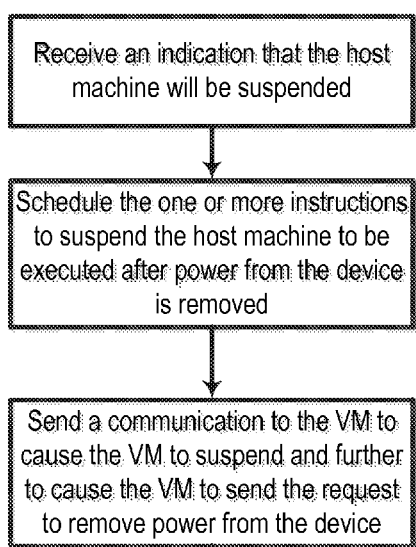
FIGS. 2A-2B are simplified swim diagrams illustrating removing power from a device assigned to a virtual machine in response to an indication that the host machine will be suspended, according to an embodiment.
Figure 2A:
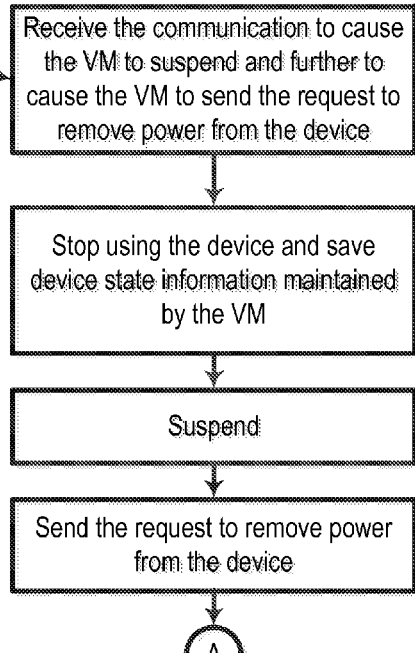
Figure 2B:
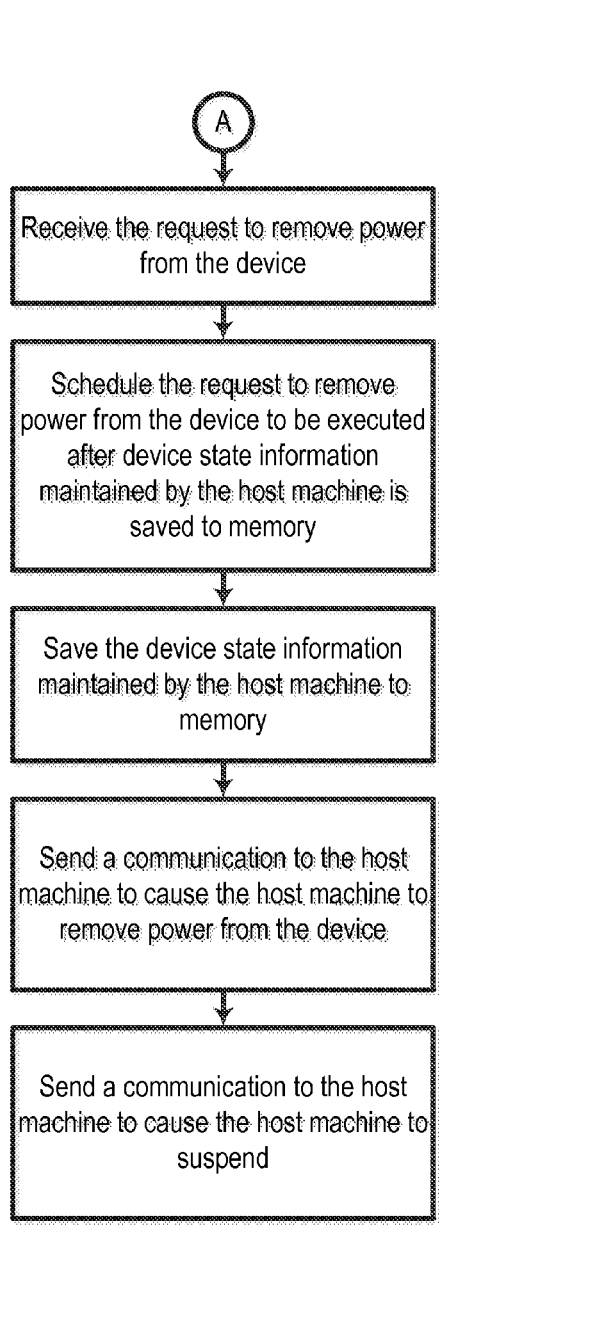

FIGS. 2A-2B are simplified swim diagrams illustrating removing power from a device assigned to a virtual machine in response to an indication that the host machine will be suspended, according to an embodiment.

In FIG. 2A, hypervisor 130 receives an indication that the host machine will be suspended. The host machine may suspend for a variety of reasons. In an example, the host machine may receive an input from the user to cause the host machine to suspend. In this example, notification module 132 may receive the indication that the host machine will be suspended in response to the user request. In another example, if the host machine is in an idle state exceeding a threshold period of time, the host machine may suspend. In this example, notification module 132 may receive the indication that the host machine will be suspended in response to the host machine being in the idle state exceeding the threshold period of time.

The host machine may run VM 102, and one or more devices may be assigned to VM 102. It may be beneficial to remove power from the devices assigned to VM 102 to, for example, conserve power. After receiving the indication that the host machine will be suspended, hypervisor 130 may schedule the one or more intructions to suspend the host machine to be executed after an event occurs. In other words, task module 134 may effectively "trap" the instructions to suspend the host machine such that the host machine does not suspend until after the event occurs. In FIG. 2A, hypervisor 130 schedules the one or more intructions to suspend the host machine to be executed after power is removed from the device. In another example, hypervisor 130 may schedule the one or more intructions to suspend the host machine to be executed after VM 102 suspends.

Hypervisor 130 may then send a communication to VM 102 to cause VM 102 to suspend and further to cause VM 102 to send the request to remove power from the device. VM 102 receives this communication, and in response to this communication, VM 102 stops using the device and saves the device state information maintained by VM 102 to memory (e.g., to virtual memory or virtual disk). VM 102 then suspends and sends the request to remove power from the device to hypervisor 130. It should be understood that VM 102 may also send the request to remove power from the device to the hypervisor 130 and then suspend.

In an example, notification module 132 sends the communication to VM 102 to cause VM 102 to suspend and further to cause VM 102 to send the request to remove power from the device. In this example, notification module 132 may subsequently receive an indication that VM 102 has been suspended.

In FIG. 2B, hypervisor 130 receives the request to remove power from the device. Hypervisor 130 may schedule the request to remove power from the device to be executed after an event occurs. In other words, task module 134 may effectively "trap" the request to remove power from the device such that the request is not executed until after the event occurs. In FIG. 2B, hypervisor 130 schedules the request to remove power from the device to be executed after device state information maintained by the host machine is saved to memory.

Hypervisor 130 may include a state module that saves the device state information maintained by the host machine to memory. As a result, both the device state information maintained by the host machine and the device state information maintained by the VM may be saved to memory before power is actually removed from the device.

The saved device state information maintained by the host machine and the saved device state information maintained by the VM may be restored and used in the future. In an embodiment, the device state information maintained by the VM is saved before the device state information maintained by the host machine to ensure that the host machine maintains the most recent state information of the device. When power is restored to the device, the device state information maintained by the host machine may be restored before the device state information maintained by the virtual machine is restored. Accordingly, when the virtual machine resumes using the device, the state of the device is in the same state it was in when the virtual machine saved the device state information to memory.

After the device state information maintained by the host machine is saved to memory, hypervisor 130 may send a communication to the host machine to cause the host machine to remove power from the device. In reponse to the communication, the host machine may remove power from the device. After power is removed from the device, the one or more instructions to suspend the host machine may be executed. In an embodiment, hypervisor 130 may determine that power has been removed from the device and then send a communication to the host machine to cause the host machine to suspend. In another embodiment, the communication to the host machine to cause the host machine to remove power from the device and to cause the host machine to suspend are the same communication. For example, in response to receiving a communication to cause the host machine to remove power from the device, the host machine may remove power from the device and then suspend without receiving a separate communication.

Figure 3:
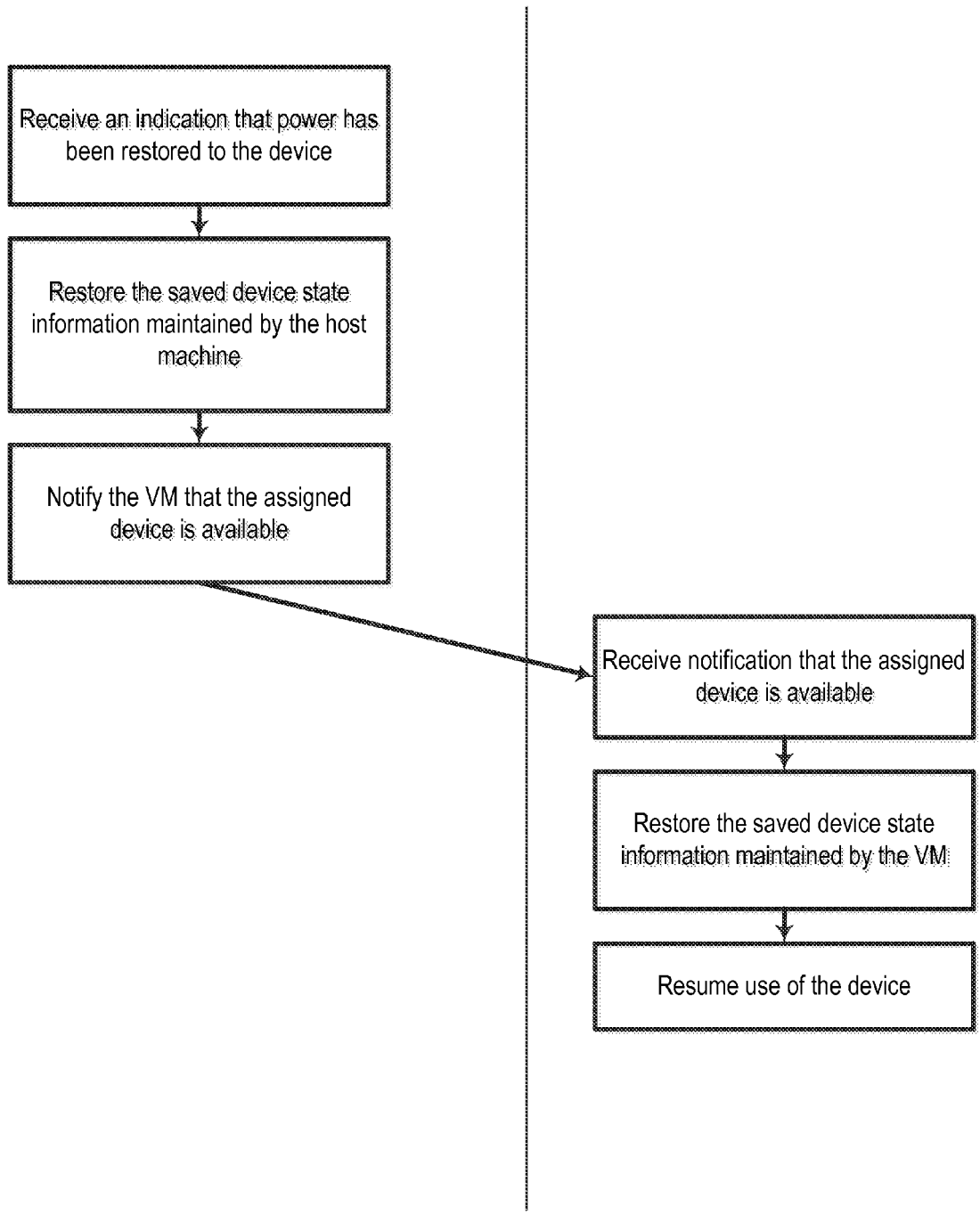
FIG. 3 is a simplified swim diagram illustrating restoring power to a device after power has been removed from the device in response to the indication that the host machine will be suspended, according to an embodiment.

FIG. 3 is a simplified swim diagram illustrating restoring power to a device after power has been removed from the device in response to the indication that the host machine will be suspended, according to an embodiment.

In FIG. 3, hypervisor 130 receives an indication that power has been restored to the device. Hypervisor 130 may receive this indication from the host machine, which restored power to the device. In response to the indication that power has been restored to the device, hypervisor 130 may restore the saved device state information maintained by the host machine and then notify VM 102 that the assigned device is available for use. Hypervisor 130 may send the notification to VM 102 in response to a user pressing a key on the keyboard.

When hypervisor 130 notifies VM 102 that the assigned device is available for use, VM 102 may be in a suspend mode. In an example, hypervisor 130 sends VM 102 a wake signal to notify VM 102 that the assigned device is available and VM 102 exits the suspend mode. In another example, hypervisor 130 causes an interrupt to wake up VM 102.

VM 102 receives the notification from hypervisor 130 that the assigned device is available for use. In response to the notification, VM 102 may restore the saved device state information maintained by the virtual machine, and then resume using the device. VM 102 may resume using the device based on the previously saved device state information. In an embodiment, the device state information maintained by the host machine is restored before the device state information maintained by VM 102 is restored to ensure that VM 102 is in the proper state (e.g., the state VM 102 was in before VM 102 entered the suspend mode). VM 102 may then resume using the device based on the previously saved state information maintained by VM 102.

Although the VM and host machine are described as being suspended or shut down, other modes in which the VM and host machine may enter may be applicable. For example, the VM or host machine may be in a sleep mode.

IV. Example Methods

Figure 4:
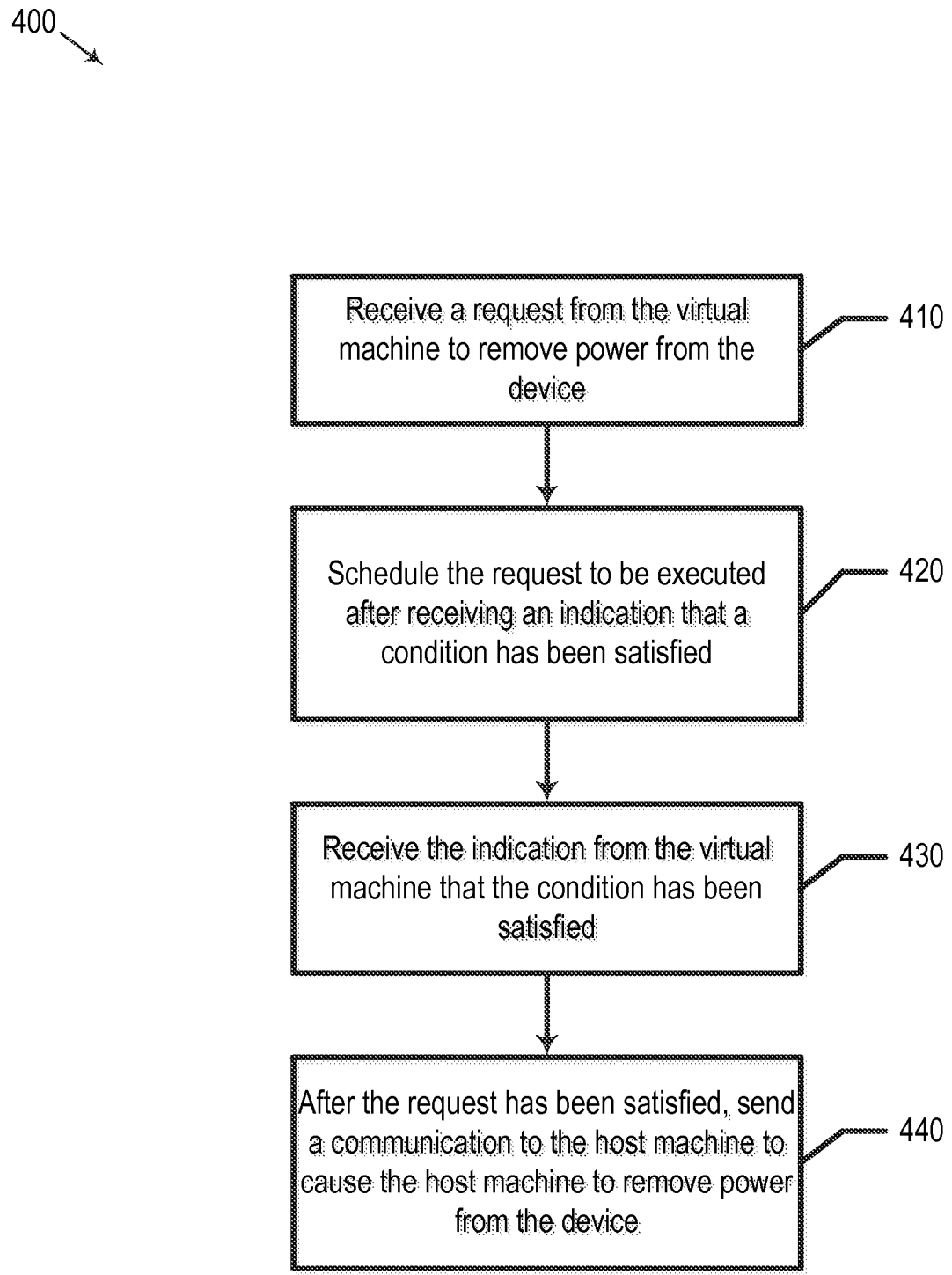
FIG. 4 is a simplified flowchart illustrating a method of removing power from a device assigned to a virtual machine running on a host machine, according to an embodiment.

FIG. 4 is a simplified flowchart illustrating a method 400 of removing power from a device assigned to a virtual machine running on a host machine. Method 400 is not meant to be limiting and may be used in other applications.

Method 400 includes steps 410-440. In a step 410, a request from the virtual machine to remove power from the device is received. In an example, notification module 132 receives the request from VM 102 to remove power from the device.

In a step 420, the request, to remove power from the device, is scheduled to be executed after receiving an indication that a condition has been satisfied. In an example, task module 134 schedules the request, to remove power from the device, to be executed after receiving the indication that the condition has been satisfied.

In a step 430, the indication from the virtual machine that the condition has been satisfied is received. In an example, notification module 132 receives the indication from VM 102 that the condition has been satisfied.

In a step 440, after the request has been satisfied, a communication is sent to the host machine to cause the host machine to remove power from the device. In an example, after the request has been satisfied, power down module 136 sends a communication to the host machine to cause the host machine to remove power from the device.

It is also understood that additional method steps may be performed before, during, or after steps 410-440 discussed above. For example, method 400 may include a step of sending a communication to the virtual machine to cause the virtual machine to suspend and further to cause the virtual machine to send the request to remove power from the device. It is also understood that one or more of the steps of method 400 described herein may be omitted, combined, or performed in a different sequence as desired.

Figure 5:
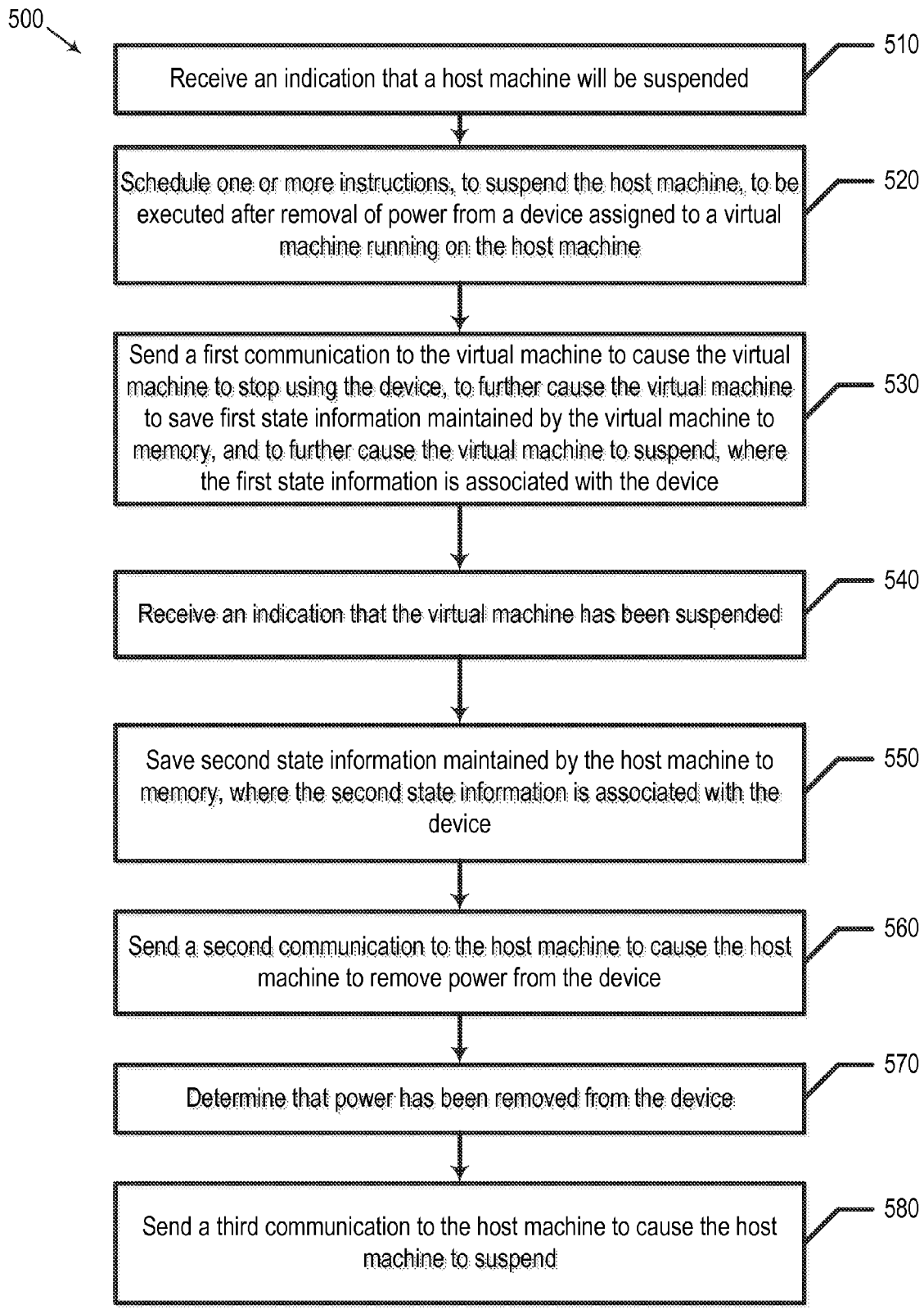
FIG. 5 is a simplified flowchart illustrating a method of removing power from a device assigned to a virtual machine running on a host machine in response to an indication that the host machine will be suspended, according to an embodiment.

FIG. 5 is a simplified flowchart illustrating a method 500 of removing power from a device assigned to a virtual machine running on a host machine in response to an indication that the host machine will be suspended. Method 500 is not meant to be limiting and may be used in other applications.

Method 500 includes steps 510-580. In a step 510, an indication that a host machine will be suspended is received. In an example, notification module 132 receives an indication that the host machine will be suspended.

In a step 520, one or more instructions, to suspend the host machine, is scheduled to be executed after removal of power from the device. In an example, task module 134 schedules one or more instructions, to suspend the host machine, to be executed after removal of power from the device.

In a step 530, a first communication is sent to the virtual machine to cause the virtual machine to stop using the device, to further cause the virtual machine to save first state information maintained by the virtual machine to memory, and to further cause the virtual machine to suspend, where the first state information is associated with the device. The first communication may be sent in response to receiving the indication that the host machine will be suspended. In an example, responsive to receiving the indication that host machine 101 will be suspended, notification module 132 sends a first communication to VM 102 to cause VM 102 to stop using the device, to further cause VM 102 to save first state information maintained by VM 102 to memory, and to further cause VM 102 to suspend, where the first state information is associated with the device.

In a step 540, an indication that the virtual machine has been suspended is received. In an example, notification module 132 receives the indication that VM 102 has been suspended.

In a step 550, second state information maintained by the host machine is saved to memory, where the second state information is associated with the device. The second state information may be saved in response to receiving the indication that the virtual machine has been suspended. In an example, responsive to receiving the indication that the virtual machine has been suspended, hypervisor 130 saves second state information maintained by the host machine to memory, where the second state information is associated with the device.

In a step 560, a second communication is sent to the host machine to cause the host machine to remove power from the device. The second communication may be sent after the second state information maintained by the host machine is saved to memory. In an example, after the second state information is saved to memory, power down module 136 sends a second communication to the host machine to cause the host machine to remove power from the device.

In a step 570, it is determined that power has been removed from the device. In an example, hypervisor 130 determines that power has been removed from the device.

In a step 580, a third communication is sent to the host machine to cause the host machine to suspend. The third communication may be sent in response to the removal of power from the device. In an example, responsive to the removal of power from the device, hypervisor 130 sends a third communication to the host machine to cause the host machine to suspend. In response to the third communication, the host machine may suspend.

It is also understood that additional method steps may be performed before, during, or after steps 510-580 discussed above. It is also understood that one or more of the steps of method 500 described herein may be omitted, combined, or performed in a different sequence as desired.

V. Example Computing System

Figure 6:
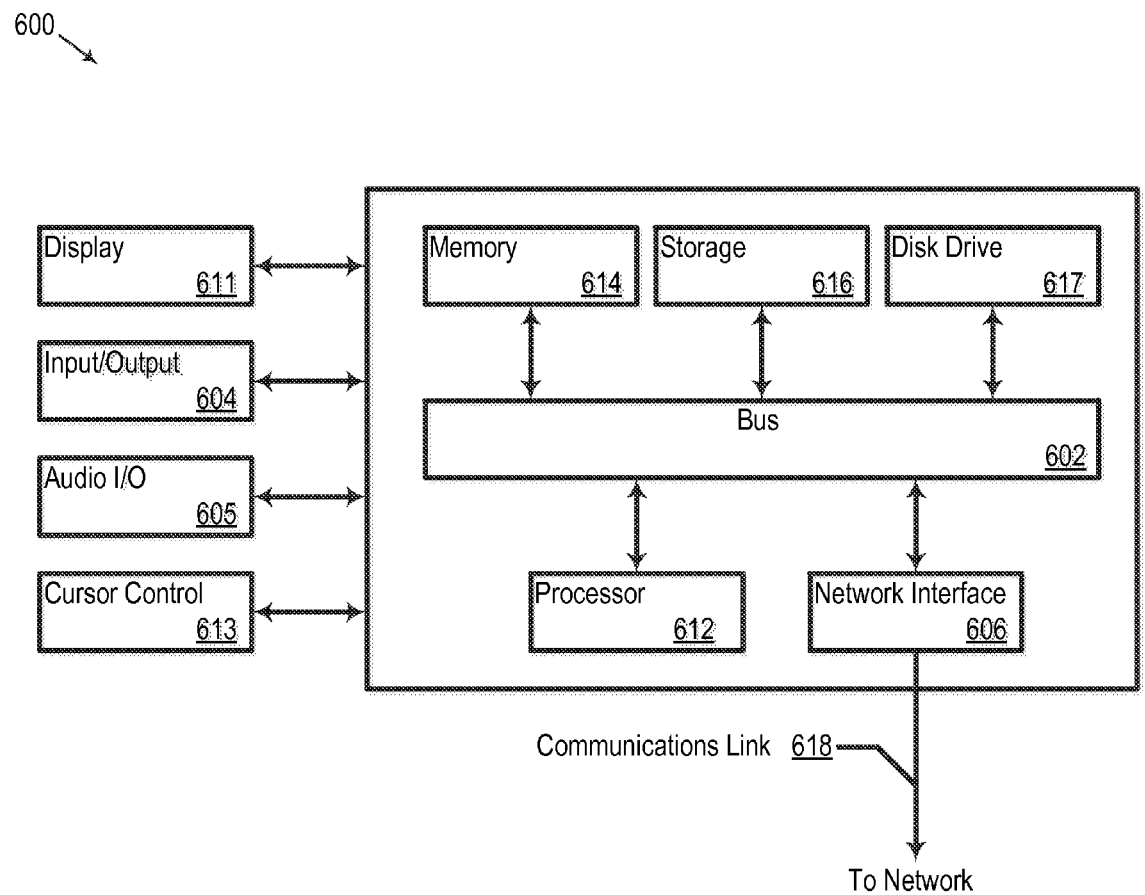
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, host machine 101 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a microcontroller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for removing power from a device assigned to a virtual machine running on a host machine, the system comprising:
    a notification module that receives a request from a virtual machine running on a host machine to remove power from a device assigned to the virtual machine, and receives an indication that first state information of the device has been saved to memory, wherein the virtual machine runs a guest operating system, and the first state information is maintained by the virtual machine;
    a task module that manages an execution priority for requests, wherein the task module schedules the request to be executed after the notification module receives the indication; and
    a power down module that, in response to execution of the request, sends a communication to the host machine to cause the host machine to remove power from the device.

2. The system of claim 1, wherein the host machine, in response to the communication, removes power from the device.

3. The system of claim 2, wherein the virtual machine includes a state module that saves the first state information of the device to the memory, and wherein the virtual machine stops using the device and the state module saves the first state information to the memory before the request is executed.

4. The system of claim 3, further comprising:
    a second notification module that communicates with the host machine and that receives a second indication that power has been restored to the device assigned to the virtual machine,
    wherein the first notification module, in response to the second indication that power has been restored to the device, notifies the virtual machine that the assigned device is available, and
    the notification to the virtual machine causes the state module to restore the saved first state information maintained by the virtual machine.

5. The system of claim 4, wherein the virtual machine resumes using the device after the saved first state information has been restored.

6. The system of claim 5, wherein the first notification module sends a second communication to the virtual machine to cause the virtual machine to suspend and further to cause the virtual machine to send the request to remove power from the device, and the virtual machine is suspended before the request is executed.

7. The system of claim 6, further comprising:
    a second state module that saves second state information of the device assigned to the virtual machine, wherein the second state information is maintained by the host machine, and wherein the first state information maintained by the virtual machine is different from the second state information maintained by the host machine.

8. The system of claim 7, wherein the second notification module
    receives a third indication that the host machine will be suspended,
    the first notification module, in response to the second notification module receiving the third indication that the host machine will be suspended, sends the second communication to the virtual machine to cause the virtual machine to suspend,
    the task module schedules one or more instructions to suspend the host machine to be executed after removal of power from the device, and
    the power down module, in response to the removal of power from the device, sends a third communication to the host machine to cause the host machine to suspend.

9. The system of claim 8, wherein the second notification module receives the third indication that the host machine will be suspended in response to a user request.

10. The system of claim 8, wherein the host machine, in response to the third communication, suspends.

11. The system of claim 7, wherein the second state module, in response to the second notification module receiving the second indication that power has been restored to the device, restores the saved second state information maintained by the host machine, and the second state module restores the saved second state information maintained by the host machine before the first state module restores the saved first state information maintained by the virtual machine.

12. The system of claim 1, further comprising:
a hypervisor including a second state module that saves second state information of the device assigned to the virtual machine, wherein the second state information is maintained by the host machine, the first state information maintained by the virtual machine is different from the second state information maintained by the host machine, and the first state information is not maintained by the hypervisor.

13. The system of claim 1, wherein the host machine removes power from the first device without removing power from a second device assigned to the virtual machine.

14. A method of removing power from a device, the method comprising:
receiving a request from a virtual machine to remove power from a device assigned to the virtual machine, wherein the virtual machine runs on a host machine and runs a guest operating system;
scheduling the request to remove power from the device to be executed after receiving an indication that first state information of the device has been saved to a memory, the first state information maintained by the virtual machine;
receiving the indication from the virtual machine that the first state information of the device has been saved to the memory; and
after the request has been satisfied, sending a communication to the host machine to cause the host machine to remove power from the device.

15. The method of claim 14, further comprising determining that power has been removed from the device.

16. The method of claim 15, further comprising:
sending a communication to the virtual machine to cause the virtual machine to stop using the device and to further cause the virtual machine to save the first state information of the device assigned to the virtual machine to the memory;
wherein the first state information is saved to the memory before the request is executed.

17. The method of claim 16, further comprising:
receiving an indication that power has been restored to the device; and
in response to the indication that power has been restored to the device, notifying the virtual machine that the assigned device is available,
wherein the notification to the virtual machine causes the virtual machine to restore the saved first state information maintained by the virtual machine.

18. The method of claim 17, further comprising:
receiving an indication that the host machine will be suspended;
scheduling one or more instructions, to suspend the host machine, to be executed after removal of power from the device;
in response to the receiving the indication that the host machine will be suspended, sending a second communication to the virtual machine to cause the virtual machine to suspend;
in response to receiving the indication that the first state information of the device has been saved to the memory, saving second state information maintained by the host machine, the second state information being associated with the device and being different from the first state information; and
in response to the removal of power from the device, sending a third communication to the host machine to cause the host machine to suspend.

19. A non-transitory machine-readable medium comprising a first plurality of machine-readable instructions that executed by one or more processors are adapted to cause the one or more processors to perform a method comprising:
receiving an indication that a host machine will be suspended;
scheduling one or more instructions, to suspend the host machine, to be executed after removal of power from a device assigned to a virtual machine, wherein the virtual machine runs on the host machine and runs a guest operating system;
responsive to receiving the indication that the host machine will be suspended, sending a first communication to the virtual machine to cause the virtual machine to stop using the device, to further cause the virtual machine to save first state information maintained by the virtual machine to memory, and to further cause the virtual machine to suspend, wherein the first state information is associated with the device;
receiving an indication that the virtual machine has been suspended;
responsive to receiving the indication that the virtual machine has been suspended, saving second state information maintained by the host machine to memory, wherein the second state information is associated with the device;
after saving the second state information, sending a second communication to the host machine to cause the host machine to remove power from the device;
determining that power has been removed from the device; and
responsive to the removal of power from the device, sending a third communication to the host machine to cause the host machine to suspend.

20. The non-transitory machine-readable medium of claim 19, further comprising a second plurality of machine-readable instructions that when executed by one or more processors are adapted to cause the one or more processors to perform a method comprising:
receiving an indication that power has been restored to the device;
restoring the saved second state information maintained by the host machine; and
after the restoring, notifying the virtual machine that the assigned device is available, wherein the notification causes the virtual machine to restore the first saved state information maintained by the virtual machine.

* * * * *